United States Patent
Bobichon et al.

(10) Patent No.: US 7,336,843 B2
(45) Date of Patent: Feb. 26, 2008

(54) METHOD AND DEVICE FOR COMPRESSING DATA TO BE TRANSMITTED AT CONSTANT BIT RATE

(75) Inventors: Yves Bobichon, Cannes la Bocca (FR); Frédéric Falzon, Nice (FR)

(73) Assignee: Alcatel, Paris (FR)

(*) Notice: Subject to any disclaimer, the term of this patent is extended or adjusted under 35 U.S.C. 154(b) by 586 days.

(21) Appl. No.: 10/487,082

(22) PCT Filed: Sep. 12, 2002

(86) PCT No.: PCT/FR02/03106

§ 371 (c)(1),
(2), (4) Date: Feb. 19, 2004

(87) PCT Pub. No.: WO03/024118

PCT Pub. Date: Mar. 20, 2003

(65) Prior Publication Data

US 2004/0197024 A1 Oct. 7, 2004

(30) Foreign Application Priority Data

Sep. 13, 2001 (FR) .................................. 01 11851

(51) Int. Cl.
*G06K 9/36* (2006.01)
*G06K 9/46* (2006.01)

(52) U.S. Cl. ...................... 382/251; 382/232

(58) Field of Classification Search ............... 382/232, 382/233, 234, 235, 236, 237, 250, 251, 252, 382/253, 166

See application file for complete search history.

(56) References Cited

U.S. PATENT DOCUMENTS

| | | | | |
|---|---|---|---|---|
| 5,440,404 A | * | 8/1995 | Okamoto | 382/246 |
| 6,091,777 A | * | 7/2000 | Guetz et al. | 375/240.11 |
| 6,175,650 B1 | * | 1/2001 | Sindhu et al. | 382/171 |
| 6,331,870 B1 | * | 12/2001 | LeCompte | 348/144 |

FOREIGN PATENT DOCUMENTS

| | | |
|---|---|---|
| EP | 0 778 708 A2 | 6/1997 |
| EP | 1 037 470 A1 | 9/2000 |
| EP | 1 096 803 A2 | 5/2001 |

OTHER PUBLICATIONS

J-P. Leduc, "Bit-Rate Control of or Digital TV and HDTV Codecs" Signal Processing. Image Communication, Elsevier Science Publishers, Amsterdam, NL, vol. 6, No. 1, Mar. 1, 1994, pp. 25-45 XP000429149.

* cited by examiner

*Primary Examiner*—Samir Ahmed
*Assistant Examiner*—Amara Abdi
(74) *Attorney, Agent, or Firm*—Sughrue Mion, PLLC

(57) ABSTRACT

The invention concerns a method of compressing and transmitting digital data, in particular images, at a constant bit rate, the method comprising the following steps:
splitting input data into blocks of data,
applying an orthogonal or bi-orthogonal transform (12) to each block,
quantizing (14) the coefficients obtained by applying the transform,
entropically coding (20) the quantized coefficients,
temporarily saving the data resulting from coding in a buffer memory (18),
removing a particular number of bits from the memory for each block of digital data, and
adjusting the quantizing step by applying a control function (50) to obtain, after coding, a number of bits close to the number of bits removed from the memory for each block of data.

Figure 3:
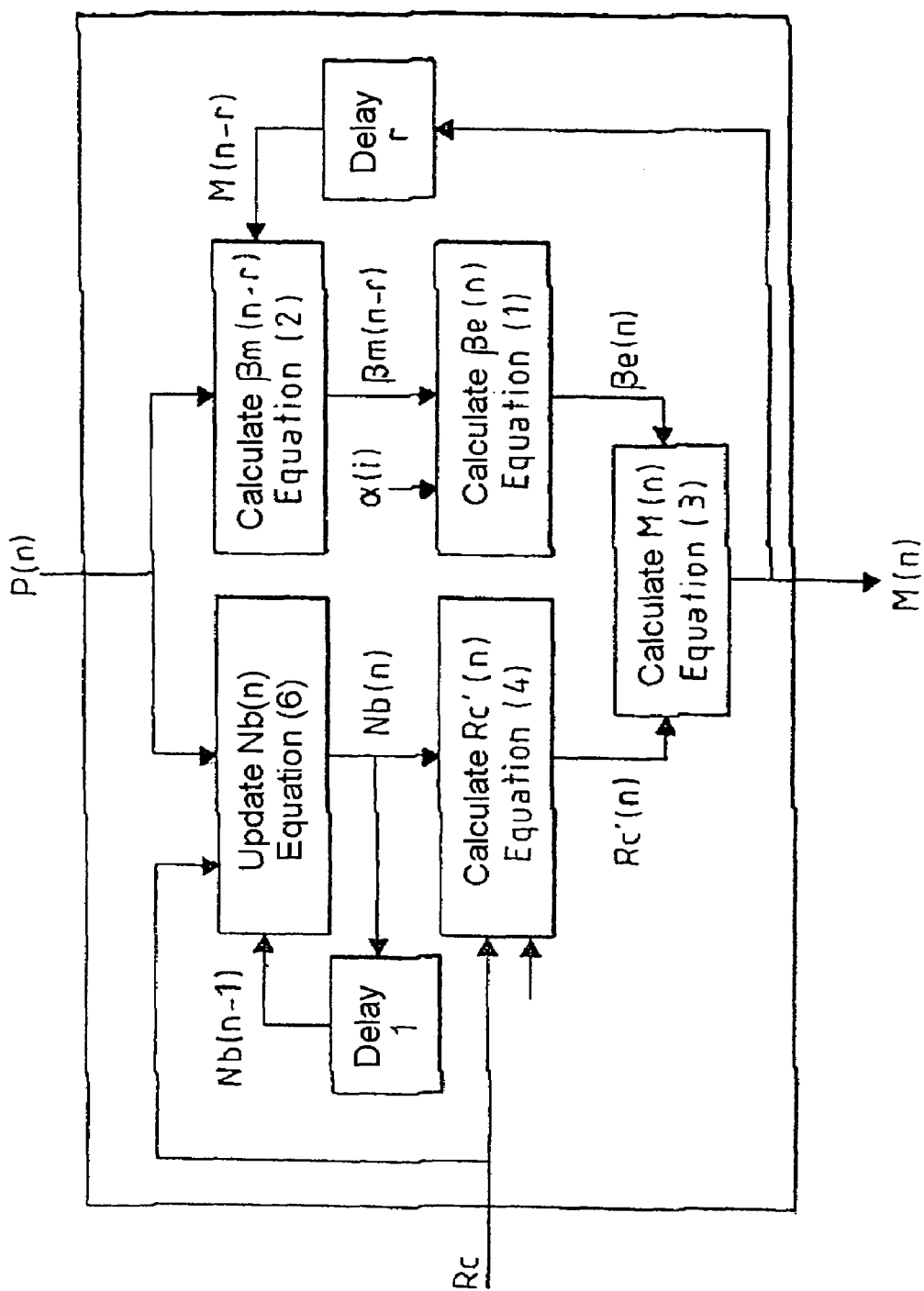

The control function (50) takes account of the data bit rate measured for at least the preceding block.

12 Claims, 2 Drawing Sheets

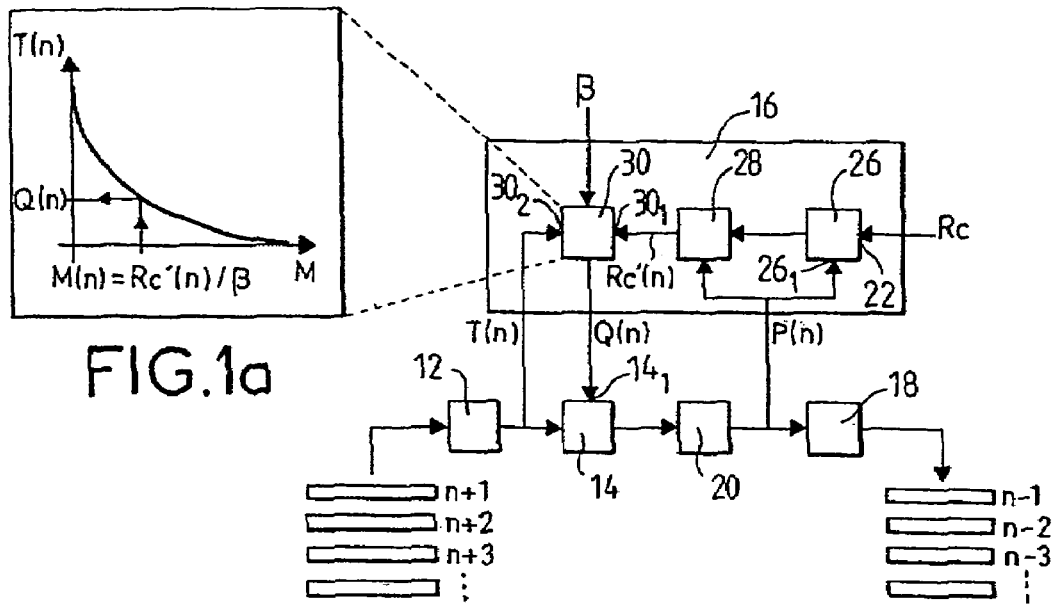
FIG.1a
FIG.1
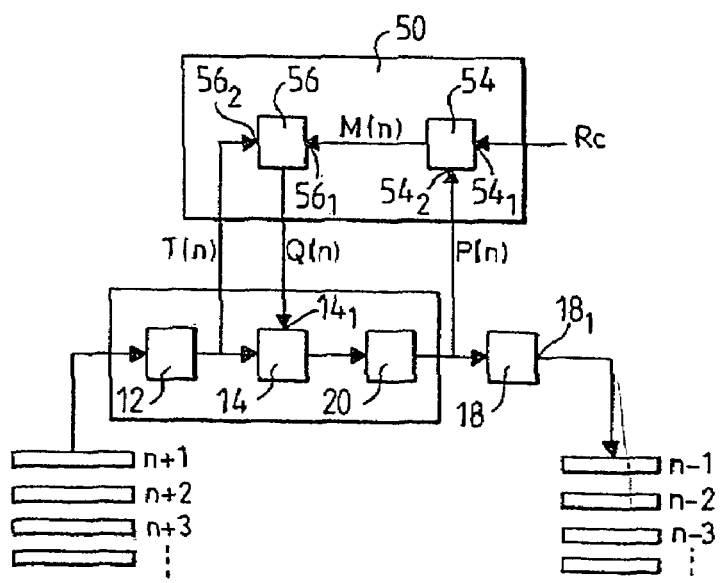
FIG.2

METHOD AND DEVICE FOR COMPRESSING DATA TO BE TRANSMITTED AT CONSTANT BIT RATE

The invention relates to a method and to a device for compressing data, in particular images, to be transmitted at a constant bit rate.

It concerns particularly, but not exclusively, a device of this kind for transmitting image data from a satellite.

An Earth observation satellite carries a plurality of sensors continuously transmitting images of terrestrial areas. The number of sensors and the image resolution are generally such that the data to be transmitted exceeds the capacity of the transmission channel. It is therefore necessary to use a method of compressing the image data that does not degrade its visual quality.

A discrete cosine transform or a wavelet transform is used for this compression, for example; an orthogonal or bi-orthogonal transform is generally used, which seeks optimum decorrelation of the input signals.

However, the output bit rate of the compressor is a function of the entropy of the input signal. By "entropy" is meant the quantity of information contained in the input signal. The entropy of urban terrain is greater than the entropy of uniform terrain, for example. Given that the sensors scan a constantly varying terrain, the entropy of the input signal varies and likewise the output bit rate. However, this variation is not favorable to optimum use of the down-link transmission channel of the satellite. For optimum use, it is preferable for the bit rate to be constant. It is therefore necessary to apply bit rate regulation in order to minimize the fluctuation of the output bit rate.

FIG. 1 shows a prior art compression device incorporating regulation.

In this prior art device, images acquired on board a terrestrial satellite are processed in blocks of lines, each block comprising eight lines, for example. In FIG. 1, the blocks are represented by elongate rectangles n+1, n+2, n+3, etc. The current block n is first subjected to an orthogonal or bi-orthogonal transform 12 that decorrelates the data and supplies a set T(n) of transformed coefficients. The coefficients are quantized by a block 14 using a quantizing step Q(n) that is a function of the required bit rate and in particular of the entropy of the data T(n). To be more precise, each coefficient produced by the transform 12 is coded on a certain number of bits and the function of the quantizer is to reduce the number of bits in order to comply with the output bit rate constraint, as explained later. To satisfy said bit rate constraint, the quantizing step Q(n) is made dependent on the result of a regulation operation 16.

The quantized data is transmitted to the input of a regulation memory (buffer memory) 18 via a coder 20. The coder 20 effects entropic (variable length) coding, for example Huffman coding, which assigns the lowest number of bits to the data values that appear most often and the highest number of bits to the values that appear least often. The data compressed in this way is sent to the output of the memory 18 at a constant bit rate Rc.

To apply the regulation, the block 16 has a set point input 22 to which the bit rate Rc imposed on the data at the output of the memory 18 is applied. The block 16 supplies at its output the value of the quantizing step Q(n) applied to the control input 141 of the quantizing block 14. To achieve this result, the block 16 includes a control unit 26 receiving at an input 22 the set point bit rate Rc and at an input 261 data representing the bit rate produced by the coder 20. The output bit rate P(n) of the coder 20 is not the bit rate produced by block n but the most recent measurable value of the bit rate produced by the coder at the time of assigning the block n. This is because the block n has not yet been coded at the time of calculating Q(n) (i.e. of assigning the bit rate of the block n), and P(n) is therefore not yet known. The state of the buffer memory 18 is therefore taken into account with a regulation delay r at least equal to one block of lines.

The output bit rate of the coder 20 is also applied to the input of an error corrector unit 28 that has another input receiving the output of the control unit 26.

The error corrector unit 28 takes account of the bit rate assigned by the control unit 26 and of the bit rate P(n) produced by the preceding blocks of lines and sends to its output the bit rate Rc'(n) assigned to the current block of lines.

The output of the unit 28 is applied to the input $30_1$ of a calculation unit 30 for calculating the quantizing step Q(n). The calculation unit 30 also has an input $30_2$ receiving the output data T(n) of the transformation unit 12. To calculate the quantizing step, the unit 30 classifies the moduli (absolute values) of the coefficients T(n) in decreasing value order, the coefficients with the highest moduli therefore having the lowest ranks and the zero coefficients occupying the final ranks. This classification is shown in the FIG. 1a diagram.

The calculation unit 30 divides by a fixed parameter β the bit rate Rc'(n) applied to its input $30_1$. The parameter β (expressed in bits per coefficient) is close to 5.5 in the case of a cosine transform and close to 6.5 in the case of a wavelet transform.

The integer M nearest this quotient constitutes a rank on the abscissa axis in FIG. 1a. This rank is related to one of the coefficients T(n) by the ordered coefficients curve, and this coefficient provides the basis for determining the quantizing step applied to the input 141 of the block 14.

This method of calculating a quantizing step is based on work by Stéphane MALLAT and Frédéric FALZON described in the paper "Analysis of low bit rate image transform coding" published in "IEEE transactions on signal processing, Vol. 46, N° 4, pp. 1027-1041", April 1998. Briefly, their work shows that the quantizing step determined in this way from the coefficient of rank M produces the lowest distortion after quantizing the coefficients T(n).

This compression and bit rate regulation device provides regulation that is very accurate and of relatively low cost in terms of calculation time. The assignment model used in this prior art regulation method was obtained by assuming that the signals to be compressed are regular. It follows that signals that do not satisfy this assumption are naturally not processed with the same accuracy, including signals that are constant or vary only slightly, i.e. signals that carry little information.

Knowing that, the variability of the terrain in the images is generally high (very regular areas are mixed with irregular areas), the assignment model would strictly speaking have to adapt to this variability if the compressed image is not to suffer from degraded quality in certain areas.

Starting from this observation, the inventors propose to make the parameter β of the assignment rule used to determine the quantizing step a variable parameter.

Accordingly, in accordance with the invention, the method of compressing digital data in which the bit rate of the output data is constant takes account, for each block of lines to be processed, of the bit rate measured for at least the preceding block and preferably of the bit rate measured for a plurality of successive blocks preceding the current block.

The invention is based on the observation that the parameter β varies little between two adjacent blocks of lines so that the value of β of the preceding block or of a series of preceding blocks constitutes a good estimate of the current value of β.

Accordingly, compared to the prior art technique, β is made to vary as a function of values of β measured on blocks of lines already coded.

Thus the invention generally consists in a method of compressing and transmitting digital data, in particular images, at a constant bit rate, the method comprising the following steps:

splitting input data into blocks of data, applying an orthogonal or bi-orthogonal transform to each block, quantizing the coefficients obtained by applying the transform, entropically coding the quantized coefficients, temporarily saving the data resulting from coding in a buffer memory, removing a particular number of bits from the memory for each block of digital data, and adjusting the quantizing step by applying a control function to obtain, after coding, a number of bits close to the number of bits removed from the memory for each block of data, said control function being based on measurement of the bit rate produced by the entropic coding, which method is characterized in that the control function takes account of the data bit rate measured for at least the preceding block.

The control function preferably takes account of the bit rate measured for a plurality of successive blocks preceding the current block.

In a preferred embodiment, the coefficients obtained by applying the orthogonal or bi-orthogonal transform are ordered in order of decreasing moduli and the quantizing step is obtained from the modulus of the coefficient whose rank is equal to the integer nearest the ratio of the target bit rate and a parameter $\beta_e(m)$, said parameter $\beta_e(m)$ being estimated for each block as a function of the parameter $\beta_m(n)$ measured for at least one preceding block.

In this case, the parameter $\beta_e(n)$ is advantageously estimated from the values $\beta_m(m)$ measured for a plurality b of preceding data blocks, said parameter $\beta_e(n)$ being calculated using the following equation:

$$\beta e(n) = \sum_{i=0}^{b-1} \alpha(i)\beta m(n-r-i),$$

in which:

$\beta_e(n)$ is the estimate of the parameter β for the current data block, $\beta_m(n)$ is the value of β measured for the block n, r is the regulation delay (r≧1), and α(i) is a weighting coefficient such that:

$$\sum_{i=0}^{b-1} \alpha(i) = 1.$$

In one embodiment, the values $\beta_m(n)$ are calculated using the following equation:

$$\beta_m = \frac{8P(n)}{M(n)},$$

in which P(n) is the number of bytes obtained after entropically coding the block of data of index n, and M(n) is the rank of the coefficient from which the quantizing step is deduced in the set of ordered coefficients supplied by the orthogonal or bi-orthogonal transform for the block n, said rank M(n) being obtained using the following equation:

$$M(n) = NINT\left(\frac{8Rc'(n)}{\beta_e(n)}\right)$$

in which Rc'(n) is the number of bytes assigned to the block n and NINT is the function that rounds up or down to the nearest integer.

The bit rate Rc'(n) assigned to the block n may be calculated as a function of the last measurable level in the buffer memory.

In this case, the bit rate Rc'(n) may be determined using the following equation:

$$Rc'(n) = Rc + \frac{N_0 - Nb(n-r)}{T},$$

in which Nb(n) is the level of the buffer memory after coding the data block n,

Rc is the number of bytes to be removed from the memory for each block, $N_0$ is the setpoint level and the initial level of the buffer memory, T is a time constant, and r is a positive integer corresponding to a regulation delay.

The constant T is from 1 to 10, for example.

The number b and/or the values α(i) are fixed from one block to another, for example.

Alternatively, the number b and/or the values α(i) vary from one block to another as a function of statistical properties calculated from known values of βm. In this case, the number b and/or the coefficients α(i) vary as a function of the correlation coefficient between known values of βm.

In one embodiment, the digital data consists of image data and each block of data corresponds to an entire image or to a particular number of lines of said image, for example eight lines. The method may be applied to the transmission of images of terrestrial areas acquired continuously by sensors on board an Earth observation satellite.

Other features and advantages of the invention will become apparent from the following description of embodiments of the invention given with reference to the appended drawings, in which:

FIG. 1 and FIG. 1a, already described, respectively represent a prior art digital data compression device and a diagram that shows how, in this kind of device, the quantizing step Q(n) is calculated from the ordered coefficients T(n) and the bit rate Rc'(n) assigned to the current block, FIG. 2 is a diagram of a device according to the invention, and FIG. 3 is a flowchart depicting the operation of the control device shown in FIG. 2.

The device depicted in FIG. 2 comprises, like that depicted in FIG. 1, a compression unit 40 including a decorrelator 12 which is a prior art orthogonal or bi-orthogonal transform unit, such as a cosine transform unit or a wavelet transform unit. The unit 40 also includes a quantizer 14 connected to the output of the decorrelator 12 and a variable bit rate coder 20.

A regulation buffer memory 18 is provided, also as in the FIG. 1 prior art device.

The FIG. 2 device differs from the FIG. 1 device primarily in the implementation of the regulation unit 50.

In this embodiment, as in that described hereinabove with reference to FIG. 1, the decorrelator 12 receives the data to be compressed, which is supplied by an optical image sensor (not shown), which acquires an image read line by line, and in the device the data is processed in blocks of lines, each block comprising eight lines in this example. The variable bit rate coder 20 fills the buffer memory 18 and the output 181 of the memory 18 is connected to a transmission channel whose bit rate must be constant. In other words, for each block of lines, the coder 20 must deliver a constant bit rate Rc equal to that at the output of the memory 18.

The quantizing step Q(n) for each block n of lines is chosen by the regulation function 50 to obtain a bit rate Rc at the output of the coder 20. However, in practice, such regulation cannot succeed in filling the memory 18 with a number of bytes strictly equal to Rc for each block of lines. The memory 18 absorbs bit rate variations at the output of the compression unit 40.

However, to minimize the size of the memory 18, it is preferable for the bit rate at the output of the unit 40 to be as close as possible to the target bit rate Rc. Remember that on board a satellite all components must be of minimum size.

Given these conditions, it is important to optimize the quality of the regulation unit 50.

The regulation unit 50 includes a calculation function (or unit) 56 for calculating the quantizing step similar to that depicted in FIG. 1a and a control function (or unit) 54 in accordance with the invention. The control unit 54 has an input $54_1$ to which the set point Rc is applied and an input $54_2$ receiving from the output of the unit 40 the value P(n) of the bit rate produced by the coder 20 for each block of lines n.

From the bit rate P(n) and the set point Rc, the control unit 54 calculates the rank M, which is applied to the input $56_1$ of the unit 56 for calculating the quantizing step Q. The step is calculated, as in FIG. 1a, as a function of the data T(n) obtained at the output of the decorrelator 12.

The output of the unit 56 for calculating the quantizing step is connected to the control input $14_1$ of the quantizer 14.

To explain the function of the unit 56 for determining the quantizing step Q, remember that, in the prior art device depicted in FIG. 1, regulation is based on a model that predicts the step Q(n) as a function of the bit rate assigned by the control module and involves the fixed parameter β. In the prior art device, to allow for prediction errors, the bit rate Rc'(n) assigned to the current block of lines is calculated for a posteriori correction of the prediction error observed in previously compressed blocks of lines. The expression "prediction error" refers to the difference between the number of bytes assigned to a block of lines and the number of bytes actually produced by the same block of lines. The control unit, with inputs Rc and P(n), therefore supplies a measurement of the variations in the rate of filling of the buffer memory (for each block of lines, the memory is filled with P(n) bytes and emptied of Rc bytes) that results from the prediction error and assigns a bit rate Rc'(n) to each block of lines in order to maintain the content of the buffer memory at a level as close as possible to a fixed level $N_0$, i.e. so that the filling rate varies as little as possible. From this bit rate Rc'(n), the control unit calculates for each block n of lines a rank M(n) that is the integer nearest the ratio $$\frac{Rc'(n)}{\beta},$$

as follows:

$$M(n) = NINT\left(\frac{Rc'(n)}{\beta}\right).$$

Remember that NINT is the function that rounds up or down to the nearest integer. The unit 56 then calculates the quantizing step Q(n), which is equal to the modulus of the coefficient of rank M(n) in the series of ordered coefficients T(n).

The present invention differs from the prior art device in that, instead of correcting a prediction error, the value of the parameter β is evaluated dynamically for each block n of lines. In other words, control in accordance with the invention is based on the observation that the observed prediction error is the consequence of an error in the value of the parameter β used to determine the quantizing step.

We therefore start from the hypothesis that there is an ideal value $\beta_m(n)$, yet to be determined, of the parameter β, for which the current block n of lines supplies exactly the required bit rate Rc'(n). Control in accordance with the invention supplies for each block of lines an a priori estimate $\beta_e(n)$ of the value $\beta_m(n)$.

$\beta_e(n)$ is calculated from values $\beta_m(n)$ measured for a number b of preceding blocks of lines. In this example, to this end, a linear equation of the following form is used:

$$\beta_e(n) = \sum_{i=0}^{b-1} \alpha(i)\beta_m(n - r - i) \qquad (1)$$

In the above equation:

$\beta_e(n)$ is the a priori estimate of β for the current block of lines, $\beta_m(n)$ is the value of β measured for the block n of lines, r is the regulation delay (r≧1), b is the number of blocks of lines taken into account in estimating $\beta_e(n)$; the number b may be fixed or may vary from one block of lines to another as a function of statistical properties (for example correlation coefficients) calculated from the known values of $\beta_m$, and α(i) is a weighting coefficient such that:

$$\sum_{i=0}^{b-1} \alpha(i) = 1.$$

As for the coefficient b, the values α(i) may be fixed or may vary from one block of lines to another as a function of statistical properties (correlation coefficients for example) calculated from the known values of $\beta_m$.

The coefficient $\beta_m(n)$ has the value:

$$\beta_m(n) = \frac{8P(n)}{M(n)} \quad (2)$$

In the above equation, P(n) is the bit rate produced at the output of the coder 20 by the block n of lines, the multiplier coefficient 8 allowing for the fact that the value of β is generally expressed as a number of bits per coefficient and the bit rate produced is generally expressed as a number of bytes per block of lines. M(n) is the rank of the coefficient used to obtain the quantizing step Q(n) in the set of ordered coefficients T(n) supplied by the transformation unit 12 for the block n of lines. The rank M(n) is obtained from the following equation:

$$M(n) = NINT\left(\frac{8Rc'(n)}{\beta_e(n)}\right) \quad (3)$$

In this equation, $\beta_e(n)$ is the estimate of β supplied by equation (1) above and Rc'(n) is the bit rate assigned to the block n of lines.

The bit rate Rc'(n) is calculated as a function of the last known level in the memory 18, using the equation:

$$Rc'(n) = Rc + \frac{N_0 - Nb(n-r)}{T} \quad (4)$$

in which:

Nb(n) is the level in the memory 18 after coding the block n of lines,

Rc is the target bit rate, $N_0$ is the initial level of the memory (i.e. also the set point level to be maintained in that memory), T is a time constant determining the time for the level in the memory to return to equilibrium after a disturbance, and has a value from 1 to 10, for example, and r is a positive integer corresponding to a regulation delay, with r≧1.

From equations (2) and (3), we may write:

$$\frac{8P(n)}{\beta m(n)} = NINT\left(\frac{8Rc'(n)}{\beta e(n)}\right) \quad (5)$$

Given that the memory is filled with P(n) bytes and emptied of Rc bytes each time a block n of lines is processed, the level Nb(n) of this memory after writing the block n has the value:

$$Nb(n)=Nb(n-1)+P(n)-Rc \quad (6)$$

Allowing for equation (3), (4) and (5), we therefore obtain:

$$Nb(n) = Nb(n-1) + \frac{\beta m(n)}{8} NINT\left[\left(\frac{N_0 - Nb(n-r)}{T} + Rc\right)\frac{8}{\beta e(n)}\right] - Rc \quad (7)$$

This is the equation of the control function, in which:

the magnitude adjusted is the level Nb of the buffer memory, the set point is the level $N_0$, the input (i.e. the disturbance) is $\beta_m$, and the adjustment magnitude is $\beta_e$.

The FIG. 3 schematic constitutes an integral part of the present description and depicts control of the block n of lines by the method of the invention.

Extremely accurate bit rate regulation is obtained with the method conforming to the invention.

The invention achieves a significant improvement in image quality compared to the prior art method, in which the coefficient β is constant. This is because, the value of β being closer to the optimum value, the quantizing step obtained produces the lowest distortion. Furthermore, regulation quality is improved and the reduced bit rate variation makes it possible to reduce the size of the memory 18. Moreover, it is not necessary to know the parameter β in advance, since it is calculated automatically. In other words, the development costs of this device are lower than those of the prior art device.

The invention claimed is:

1. A method of compressing and transmitting digital data, in particular images, at a constant bit rate, the method comprising:

Splitting input data into blocks of data,

Applying an orthogonal or bi-orthogonal transform to a current block,

Quantizing coefficients obtained by applying the transform,

Entropically coding the quantized coefficients,

Temporarily saving the data resulting from coding in buffer memory,

Removing a particular number of bits from the memory for each block of digital data, and adjusting the quantizing step by applying a control function to obtain, for the current block, after coding, a number of bits close to the number of bits removed from the memory for each block of data, said control function being based on measurement of the bit rate produced by the entropic coding, and said control function taking account of the data bit rate measured for at least a preceding block, Wherein the coefficient obtained by applying the orthogonal or bi-orthogonal transform are ordered in order of decreasing moduli and quantizing step is obtained from the modulus of the coefficient whose rank is equal to the integer nearest the ratio of the target bit rate and a parameter which is estimated for each block based on at least one preceding block.

2. A method according to claim 1, wherein the control function takes account of the bit rate measured for a plurality of successive blocks preceding the current block.

3. A method according to claim 1, wherein said parameter referred to as $\beta_e(n)$, is estimated from the values $\beta_m(m)$ measured for a plurality b of preceding data blocks, said parameter $\beta_e(n)$ being calculated using the following equation:

$$\beta_e(n) = \sum_{i=1}^{b-1} \alpha(i)\beta_m(n-r-i),$$

in which:

$\beta_e(n)$ is the estimate of the parameter $\beta$ for the current data block, $\beta_m(n)$ is the value of $\beta$ measured for the block n, r is the regulation delay ($r \geq 1$), and $\alpha(i)$ is a weighting coefficient such that:

$$\sum_{i=0}^{b-1} \alpha(i) = 1.$$

4. A method according to claim 3, wherein the values $\beta_m(n)$ are calculated using the following equation:

$$\beta_m = \frac{8P(n)}{M(n)},$$

in which P(n) is the number of bytes obtained after entropically coding the block of data of index n, and M(n) is the rank of the coefficient from which the quantizing step is deduced in the set of ordered coefficients supplied by the orthogonal or bi-orthogonal transform for the block n, said rank M(n) being obtained using the following equation:

$$M(n) = NINT\left(\frac{8Rc'(n)}{\beta_e(n)}\right)$$

in which Rc'(n) is the number of bytes assigned to the block n and NINT is the function that rounds up or down to the nearest integer.

5. A method according to claim 4, wherein the bit rate Rc'(n) assigned to the block n is calculated as a function of the last measurable level in the buffer memory.

6. A method according to claim 5, wherein the bit rate Rc'(n) is determined using the following equation:

$$Rc'(n) = Rc + \frac{N_O - Nb(n-r)}{T},$$

in which Nb(n) is the level of the buffer memory after coding the data block n,

Rc is the number of bytes to be removed from the memory for each block, $N_O$ is the setpoint level and the initial level of the buffer memory, T is a time constant, and r is a positive integer corresponding to a regulation delay.

7. A method according to claim 6, wherein the constant T is from 1 to 10.

8. A method according to claim 3, wherein the number b and/or the values $\alpha(i)$ are fixed from one block to another.

9. A method according to claim 3, wherein the number b and/or the values $\alpha(i)$ vary from one block to another as a function of statistical properties calculated from known values of $\beta_m$.

10. A method according to claim 9, wherein the number b and/or the coefficients $\alpha(i)$ vary as a function of the correlation coefficient between known values of $\beta_m$.

11. A method according to claim 1, wherein the digital data consists of image data and each block of data corresponds to an entire image or to a particular number of lines of said image, for example eight lines.

12. The method according to claim 11, wherein the input data comprises images of terrestrial areas acquired continuously by sensors on board an Earth observation satellite.

* * * * *